Oct. 12, 1926. 1,602,914
F. L. LIPCOT
CUSHIONED SUPPORT FOR THE BODIES OF MOTOR VEHICLES
Filed March 5, 1924 2 Sheets-Sheet 1
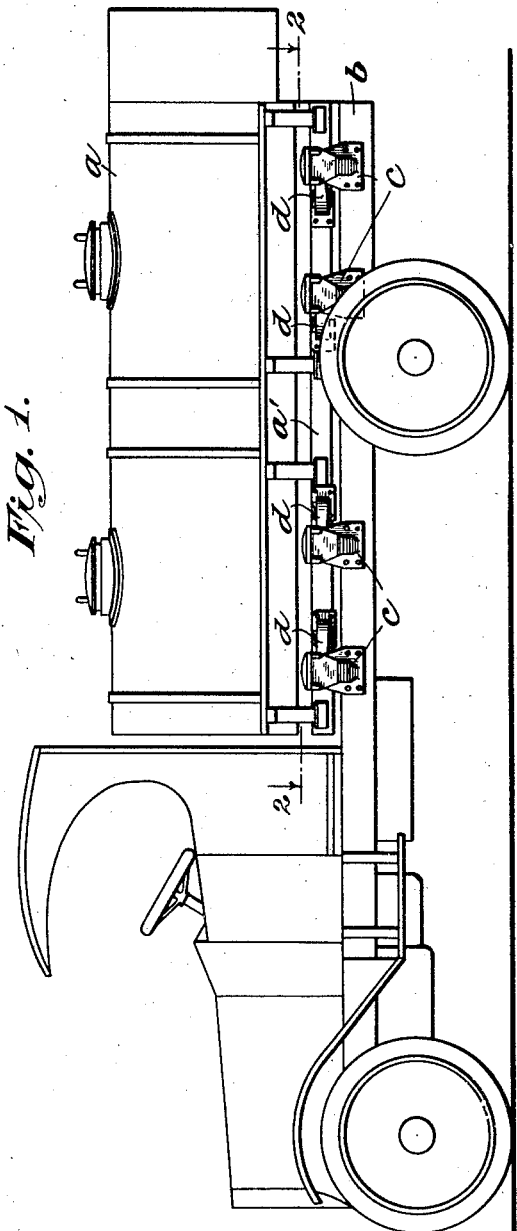
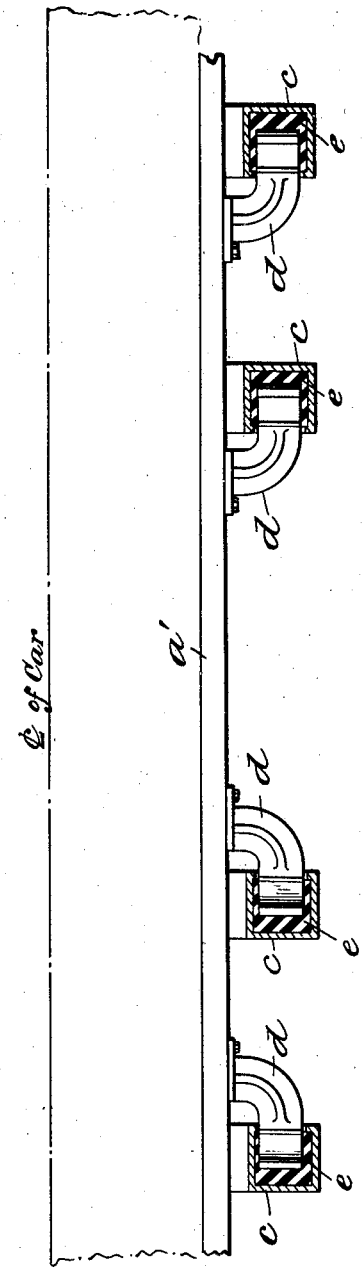
INVENTOR
Fred L. Lipcot
BY
Redding, Greeley, O'Shea and Campbell
ATTORNEYS Oct. 12, 1926.  1,602,914
F. L. LIPCOT
CUSHIONED SUPPORT FOR THE BODIES OF MOTOR VEHICLES
Filed March 5, 1924   2 Sheets-Sheet 2
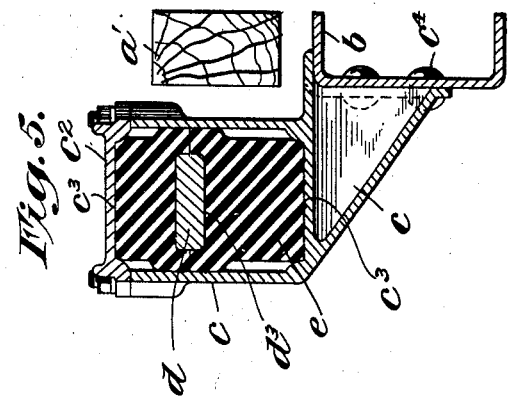
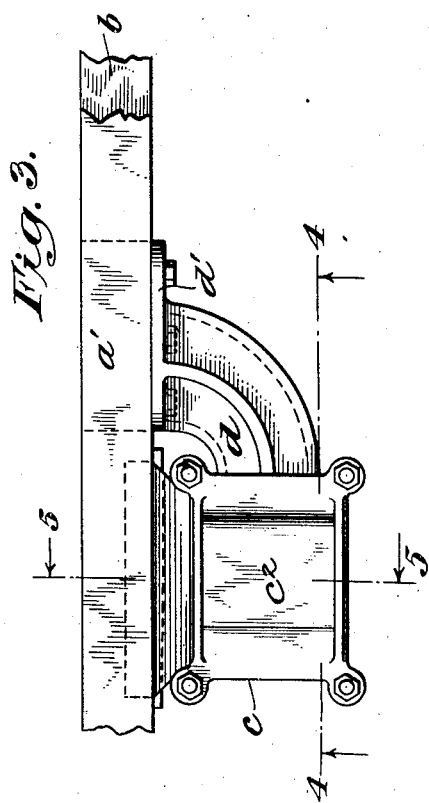
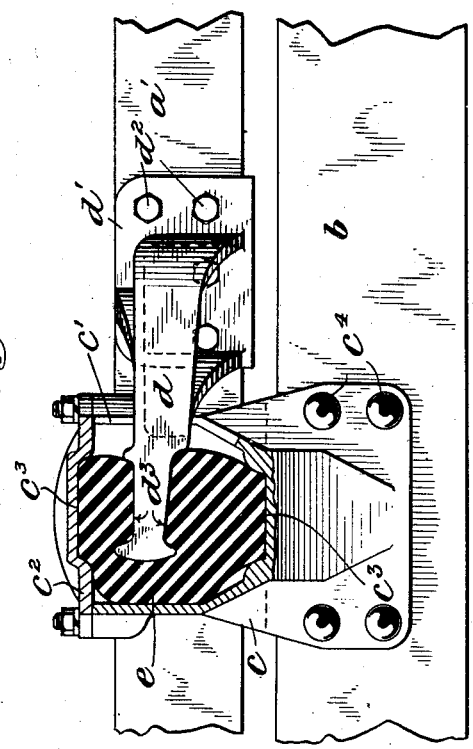
INVENTOR
Fred L. Lipcot
BY
Redding, Greeley, O'Shea and Campbell ATTORNEYS Patented Oct. 12, 1926.

1,602,914

UNITED STATES PATENT OFFICE.

FRED L. LIPCOT, OF NEW YORK, N. Y., ASSIGNOR TO INTERNATIONAL MOTOR COMPANY, OF NEW YORK, N. Y., A CORPORATION OF DELAWARE.

CUSHIONED SUPPORT FOR THE BODIES OF MOTOR VEHICLES.

Application filed March 5, 1924. Serial No. 696,931.

This invention relates broadly to non-metallic yielding connections between relatively movable parts of a motor vehicle for the purpose of cushioning the shocks and vibrations impressed upon one such part to prevent their transmission in whole or in part to another vehicle part. Heavy load carrying vehicles such as are adapted to convey substantial loads over relatively great distances are necessarily of a rugged construction and have a tendency to transmit road shocks and vibrations from one part thereof to another with resultant wear and consequent noise in operation. In going over irregularities in the road, the vehicle chassis has a tendency to weave while at changes in speed as well as in passing over inequalities in the road the body of the vehicle when heavily loaded has a tendency to move bodily with respect to the chassis. Such relative movements cause an appreciable wear upon the connections between the chassis frame and the body of a vehicle and this wear not only results in deterioration of the vehicle but in objectionable noises and squeaks.

To overcome these objectionable features it has heretofore been proposed in some constructions to permit limited play between the vehicle body and the chassis frame and cushion blows by means of rubber cushions while the bolts securing the body to the chassis have been provided with non-metallic bushings and washers. Such a connection however is open to the objection that when there is a tendency toward relative bodily movement between the chassis and frame the relation of parts is altered whereby undue strains may be set up on one part of the body or chassis to cause a weakening thereof or a rupture. This is particularly the case in motor trucks arranged to carry tanks of liquid where the great mass of liquid in the tanks surging back and forth at every change in the velocity of the vehicle or inequality in the road bed impresses enormous stresses upon the connections between the tank and the chassis frame. It is an object of the present invention to provide a yielding non-metallic connection and support for the body of a motor vehicle and more particularly for a tank body. Such a tank is usually carried upon a sub-frame and this sub-frame is connected usually by connections of a metallic character to the chassis frame of the vehicle. According to the present invention it is proposed to replace such metallic connections by a wholly non-metallic connection and support interposed between the chassis frame and body of the motor vehicle or in the case of a tank body between the sub-frame of the tank and the chassis frame. More particularly this support comprises an arm carried with one of the parts and adapted to enter an opening in a housing carried with the other part which housing contains yielding non-metallic material engaging the end of the arm. The connections according to the present invention are preferably disposed upon opposite sides of the vehicle body although in certain circumstances it may be preferable to dispose these connections at the front and rear ends thereof. In order to overcome longitudinal stresses the arms may be disposed to extend in opposite directions whereby the reaction of the rubber blocks to the arms may be said to be opposed one with another to cushion stresses in opposite directions.

The invention will now be described in greater particularity in connection with the accompanying drawings illustrating a preferred embodiment thereof and in which:

Figure 1 is a view in side elevation of a motor truck adapted to carry a tank and embodying the present invention.

Figure 2 is a view in horizontal section and partly in elevation taken on the plane indicated by the line 2—2 in Figure 1 and looking in the direction of the arrows showing the connecting and supporting means between the chassis frame and tank.

Figure 3 is a fragmentary view showing one of the connecting and supporting devices, looking from above in Figure 1.

Figure 4 is a view partly in section and partly in elevation taken in the plane indicated by the line 4—4 in Figure 3 and looking in the direction of the arrows.

Figure 5 is a sectional view taken in the plane indicated by the line 5—5 in Figure 3 and looking in the direction of the arrows.

In the illustrated embodiment a motor truck is disclosed provided with a tank to contain liquids. As the running gear and associated parts of the truck form no part of the present invention they are illustrated rather conventionally and only so much of the truck will be described as is deemed necessary to an understanding of the invention. The tank $a$ is supported upon a sub-frame $a'$ which in turn is supported from the chassis frame $b$ by the yielding non-metallic connections forming the subject matter of the present invention. Housings $c$ are shown as carried with the chassis frame $b$. These housings are formed with an opening $c'$ in one side thereof through which is adapted to extend an arm $d$ carried by means of a bracket $d'$ with the sub-frame $a'$. The arm and housing are secured to the sub-frame and chassis frame respectively by any convenient means such as bolts or rivets. In the illustrated embodiment the arm $d$ is shown as secured to the sub-frame $a'$ by means of bolts $d^2$ while the housing is shown as secured to the chassis frame $b$ by means of rivets $c^4$. One wall of the housing is open and is adapted to be closed by a removable cover plate $c^2$ bolted or otherwise secured thereto. Within the housing is disposed a block $e$ of yielding non-metallic material such as rubber which is so formed as to receive the end of the arm $d$. If desired the walls of the housing may be formed with seats $c^3$ while the arm $d$ may be formed with co-operating seats $d^3$. By suitably proportioning the block $e$ it may be retained in the housing between the seats under compression whereby the strength, resiliency and wearing qualities of the block are increased.

It will be apparent that during changes in speed as well as changes in the inclination of the chassis the center of weight of the liquid within the tank will vary causing it to surge back and forth and impress shocks and stresses upon first one end of the tank and then the other. In order to cushion these shocks and stresses and to prevent in great measure their transmission to the chassis frame, the non-metallic connections and supports are interposed between the sub-frame and chassis frame of the vehicle. It will be observed that the arms $d$ are shaped to extend outwardly from the sub-frame and then curved to extend parallel thereto. Thus when a plurality of connections are arranged on either side of the chassis frame certain of the arms may be disposed to extend in a forward direction while other of the arms are arranged to extend in a rearward direction. Should, therefore, the liquid in the tank suddenly surge to the front end thereof and impress a shock upon that end, the shock is transmitted through the arms extending in a forward direction and impressed upon the yielding non-metallic blocks $e$ to be cushioned thereby. A similar effect is obtained when the shock is applied to the rear of the tank through the instrumentality of the rearwardly extending arms.

In the drawings four yielding non-metallic connections according to the present invention are shown upon one side of the truck and it will be understood that a similar arrangement is in effect upon the opposite side. The two forwardly disposed connections have their arms extending in a forward direction while the two rearwardly disposed connections have their arms extending in a rearward direction. It will be apparent however that this arrangement and disposition of parts may be varied so that the arms extend in alternate directions.

In some circumstances it may be found advantageous to provide connections at the forward and rear ends of the body supplementing or in lieu of the disposition disclosed in the drawings.

While one specific embodiment of the invention is shown in the drawings it will be understood that various forms of housings and arms may be adopted as well as changes in the disposition thereof without departing from the spirit and scope of the invention and no limitation is intended except as indicated in the appended claims.

What I claim is:

1. The combination with the body and frame of a vehicle, of a plurality of housings mounted on either side of the frame, openings in the housings of each side facing in opposite directions, independent supporting members mounted on the body and projecting into the openings, and resilient means within the housings for bearing the supporting means.

2. The combination with the body and frame of a vehicle, of a plurality of housings mounted on either side of the frame, openings in the sides of the housings of each side facing in opposite directions, independent supporting members mounted on the body and projecting into the openings, and non-metallic yielding material confined within the housing and bearing the supporting members.

This specification signed this 1st day of March, A D., 1924.

FRED L. LIPCOT.